United States Patent
Baier et al.

(10) Patent No.: US 8,360,654 B2
(45) Date of Patent: Jan. 29, 2013

(54) RADIAL ANTIFRICTION BEARING WHICH CAN BE TAKEN APART ONLY IF DESTROYED

(75) Inventors: Richard Baier, Aurachtal (DE); Raphael Fischer, Schweinfurt (DE); Dirk Holweger, Wuerzburg (DE); Peter Niebling, Bad Kissingen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 204 days.

(21) Appl. No.: 12/445,172

(22) PCT Filed: Oct. 9, 2007

(86) PCT No.: PCT/DE2007/001794
§ 371 (c)(1),
(2), (4) Date: Jun. 30, 2009

(87) PCT Pub. No.: WO2008/043345
PCT Pub. Date: Apr. 17, 2008

(65) Prior Publication Data
US 2010/0008613 A1 Jan. 14, 2010

(30) Foreign Application Priority Data
Oct. 12, 2006 (DE) .......................... 10 2006 048 261

(51) Int. Cl.
*F16C 19/00* (2006.01)
(52) U.S. Cl. ........................................... 384/544
(58) Field of Classification Search .............. 74/544, 74/543, 537, 589, 584, 559; 301/105.1; 384/544, 384/543, 537, 589, 584, 559
See application file for complete search history.

(56) References Cited

U.S. PATENT DOCUMENTS

| | | | |
|---|---|---|---|
| 1,700,188 A * | 1/1929 | Wells | 384/584 |
| 2,383,727 A | 8/1945 | Lewis | |
| 3,897,988 A * | 8/1975 | Dickinson et al. | 384/539 |
| 4,106,827 A * | 8/1978 | Ducret et al. | 384/482 |
| 4,440,256 A * | 4/1984 | Palmer | 180/254 |
| 4,676,672 A * | 6/1987 | Tufty | 384/537 |
| 4,723,851 A * | 2/1988 | Troster et al. | 384/523 |
| 4,795,278 A * | 1/1989 | Hayashi | 384/448 |
| 4,883,371 A * | 11/1989 | Matsumoto | 384/559 |
| 4,943,171 A * | 7/1990 | Hofmann et al. | 384/537 |
| 4,958,944 A * | 9/1990 | Hofmann et al. | 384/512 |

(Continued)

FOREIGN PATENT DOCUMENTS

| | | |
|---|---|---|
| CH | 2 77 099 Y | 8/1951 |
| DE | 3 30 931 | 4/1922 |

(Continued)

*Primary Examiner* — Thomas R Hannon
(74) *Attorney, Agent, or Firm* — Lucas & Mercanti, LLP; Klaus P. Stoffel

(57) ABSTRACT

The radial antifriction bearing has an outer ring, an inner ring, and a plurality or rolling bodies arranged between the inner ring and the outer ring in such a way that the inner ring is rotatably mounted relative to the outer ring, via the rolling bodies, and the outer ring has an inner chamber in which the inner ring and/or at least one inner ring section is arranged. The inner chamber is closed at one front side of the radial antifriction bearing by a shaped marginal section of the outer ring in such a way that the inner ring and/or the at least one inner ring section is destroyed when it is removed from the outer ring.

10 Claims, 4 Drawing Sheets

U.S. PATENT DOCUMENTS

| | | | |
|---|---|---|---|
| 5,074,680 A * | 12/1991 | Hoch et al. | 384/560 |
| 5,150,973 A * | 9/1992 | Masur et al. | 384/448 |
| 5,211,489 A * | 5/1993 | Moore | 384/585 |
| 5,226,738 A * | 7/1993 | Valette et al. | 384/513 |
| 5,462,367 A * | 10/1995 | Davidson et al. | 384/459 |
| 5,490,732 A * | 2/1996 | Hofmann et al. | 384/537 |
| 5,524,988 A * | 6/1996 | Cheung | 384/537 |
| 5,725,285 A * | 3/1998 | Niebling et al. | 301/105.1 |
| 5,957,590 A | 9/1999 | Picca | |
| 6,227,624 B1 * | 5/2001 | Wiacek et al. | 301/105.1 |
| 6,315,457 B1 * | 11/2001 | Kapaan et al. | 384/544 |
| 6,322,253 B1 * | 11/2001 | Picca | 384/513 |
| 6,428,214 B2 * | 8/2002 | Tajima et al. | 384/544 |
| 6,520,684 B2 * | 2/2003 | Garcia et al. | 384/537 |
| 6,786,645 B2 * | 9/2004 | Joki et al. | 384/488 |
| 7,540,569 B2 * | 6/2009 | Morimoto et al. | 301/105.1 |
| 2001/0019639 A1 * | 9/2001 | Toda et al. | 384/537 |
| 2002/0085782 A1 * | 7/2002 | Kashiwagi et al. | 384/544 |
| 2003/0025385 A1 * | 2/2003 | Morimoto et al. | 301/105.1 |
| 2004/0022470 A1 * | 2/2004 | Toda et al. | 384/544 |
| 2008/0118197 A1 * | 5/2008 | Matsui et al. | 384/494 |
| 2010/0008613 A1 * | 1/2010 | Baier et al. | 384/548 |

FOREIGN PATENT DOCUMENTS

| | | |
|---|---|---|
| DE | 5 02 846 | 7/1930 |
| DE | 8 03 812 | 4/1951 |
| DE | 42 38 147 | 5/1994 |
| DE | 43 32 028 | 3/1995 |
| DE | 199 20 629 | 11/2000 |
| DE | 102 60 467 | 7/2004 |
| FR | 1 350 297 | 1/1964 |
| GB | 1 83 193 | 7/1922 |
| JP | 2003193139 Y | 7/2003 |
| JP | 2006029543 Y | 2/2006 |

* cited by examiner

RADIAL ANTIFRICTION BEARING WHICH CAN BE TAKEN APART ONLY IF DESTROYED

This application is a 371 of PCT/DE2007/001794 filed Oct. 9, 2007, which in turn claims the priority of DE 10 2006 048 261.1 filed Oct. 12, 2006, the priority of both applications is hereby claimed and both applications are incorporated by reference herein.

FIELD OF THE INVENTION

The invention relates to a radial roller bearing comprising an outer race, an inner race and a plurality of rolling elements, the rolling elements being arranged between the inner race and the outer race, so that the inner race is rotatably supported by the rolling elements in relation to the outer race, and the outer race comprising an internal space in which the inner race is arranged, together with a method for producing a or the radial roller bearing.

BACKGROUND OF THE INVENTION

Radial roller bearings are known in a variety of designs and are used as wheel bearings in vehicles, for example. In designing roller bearings to suit the load stress a conflict arises between the overall size of the roller bearing, which defines the overall space required for the proposed application, and the load-bearing capacity of the roller bearing. One possible way of minimizing the overall space and at the same time achieving an acceptable load-bearing capacity of the bearing is to incorporate other functions into the roller bearing.

The publication DE 102 60 467 A1, which probably forms the most immediate state of the art, discloses a vehicle radial roller bearing, which comprises an integrally formed outer race wheel flange, to which a brake disk and a wheel rim can be fitted. Owing to the absence of additional connecting elements between the radial roller bearing and the wheel rim or brake disk, the design construction takes up only a small overall space.

SUMMARY OF THE INVENTION

The object of the invention is to propose a radial roller bearing and a method for manufacturing this, which takes up little overall space and at the same time has a high load-bearing capacity.

This object is achieved by a radial roller bearing and by a method for producing the radial roller bearing set forth in the following description and shown in the drawings attached.

The radial roller bearing comprises an outer race, an inner race and a plurality of rolling elements, the inner race being rotatably supported by the rolling elements in relation to the outer race. In particular, the rolling elements roll on the outside of the inner race and on the inside of the outer race. The rolling elements may be of any type, that is to say rollers, balls or needles, for example, and may optionally be guided, in particular captively guided, in one or more rolling element cages or rims. The inner race may be integrally formed in one piece, although the inner race is preferably divided in an axial direction, in particular divided in two places, so that the inner race comprises a plurality of axial inner race sections.

The outer race is monolithically formed and encloses an internal space, in particular a cylindrical internal space, in which the inner race and/or at least one axial inner race section is arranged. The inner race and/or at least one inner race section is preferably fully integrated inside the outer race and in particular without projecting beyond one of the front faces of the outer race.

According to the invention the inner space is terminated at a front face of the radial roller bearing by a deformed rim section of the outer race, so that only by destructive means can the inner race and/or at least one inner race section be detached from the outer race. In particular the internal space is also terminated in the direction of the opposite front face of the radial roller bearing, so that removal of the inner race and/or at least one inner race section from the internal space is prevented in this direction. In an axial direction the internal space on both sides preferably only has openings with inside diameters which are smaller than the outside diameter of the inner race or the diameter of the inner race rim. Alternatively, the rolling elements inserted form a barrier to removal of the inner race and/or at least one inner race section in the internal space.

The invention proceeds from the consideration that the load-bearing capacity of a bearing depends substantially on the diameter of the inner race. For assembling the inner race, however, insertion openings must be provided, through which the inner race can be introduced. Until now, the diameter of these insertion openings has consequently also determined the external dimensions of the bearing.

According to the invention the internal space of the radial roller bearing is terminated on at least one front face of the radial roller bearing by a deformed rim section. The corresponding forming operation is performed after fitting the inner race and/or at least one inner race section in the internal space, so that although the radial roller bearing in an undeformed intermediate stage affords a correspondingly large inside diameter at the insertion opening for the inner race or section, in the finished product the inside diameter of the insertion opening is reduced by a deforming operation performed on the outer race. With this development of the radial roller bearing the outside dimensions of the radial roller bearing are minimized, whereas the load-bearing capacity of the radial roller bearing is optimized.

The deformed rim section is preferably embodied as a cup-shaped flanged shoulder, which in a cross sectional plane perpendicular to the axial extent of the radial roller bearing has a uniformly shaped, circular or virtually circular clear opening and/or passage area. The passage area, in particular the cup-shaped flanged shoulder, may also contain inlets or interruptions.

In the undeformed intermediate stage the bearing has an undeformed, likewise cup-shaped flanged shoulder, which is deformed and in particular rolled after fitting of the inner race or section, especially on the outer, wheel-side. After deformation, in particular rolling, the fitted inner race or section can only be removed by destruction of the outer race or the inner race or section itself.

In a preferred embodiment the outer race is integrally formed in one piece. This embodiment affords greater stability and hence a greater load-bearing capacity of the radial roller bearing as a whole. Since the diameters of the front face openings of the internal space in the radial roller bearing according to the invention are designed so that removal of the inner race or section arranged in the internal space is possible only by destructive means, the inner race can be fitted only by means of the proposed system for subsequent deformation of the rim section of the outer race.

In a preferred embodiment the inner race is of divided design. This embodiment is used particularly when the rolling elements are arranged in two or more rows.

In the case of a divided inner race at least one inner race section is arranged in the internal space terminated by the deformed rim section.

The radial roller bearing is preferably embodied as an angular-contact ball bearing or a tapered-roller bearing. This design is preferably used as wheel bearing in vehicles, since the bearings are largely free of play. The radial roller bearing is in particular embodied as double-row, angular-contact ball bearing.

In a preferred development of the invention this is embodied as a wheel bearing, the outer race merging into a wheel flange for accommodating a wheel rim and/or a brake disk. The wheel flange has axially aligned, optionally tapped through-holes, which are designed to receive wheel bolts, and/or similarly aligned bolts onto which the wheel nuts can be screwed.

It is especially preferred in this development that the deformed rim section forms a centering shoulder and/or a centering ring for the wheel rim and/or the brake disk.

The centering shoulder and/or centering ring in particular comprises one or more stepped, radially circumferential, annular contact face. The outer race, wheel flange and centering shoulder are preferably integrally formed.

The centering shoulder may be interrupted, so that only individual segments serve for centering of the wheel rim.

This preferred development again underlines the advantages of the radial roller bearing according to the invention compared to the state of the art. In known radial roller bearings, especially double-row, angular-contact ball bearings, the inside diameter of the front-face insertion opening of the roller bearing in the area of the wheel rim seat must be significantly larger than the outside diameter of the inner race. If a greater bearing load-bearing capacity is then required due to higher wheel loads, the inner race diameter and hence the diameter of the insertion opening must be enlarged, which inevitably leads to an increase in the diameter of the centering shoulder. Consequently the wheel rim and the brake disk also have to be adjusted to match. Such modifications are unacceptable in most applications.

In the undeformed, intermediate state the radial roller bearing according to the invention has an undeformed, flanged shoulder as preliminary for the centering shoulder of the rim and the brake disk, which compared to the centering shoulder has a larger free diameter for fitting the inner race and optional cage and rolling elements. Once the rolling elements, cage and inner race have been fitted, the undeformed, flanged shoulder is then deformed into the centering shoulder, in particular by a rolling or planishing operation, and is thereby brought to a final dimension in terms of the outside diameter, which allows fitting of the wheel rim and/or the brake disk, for example.

A further subject of the invention relates to a method for manufacturing a or the radial roller bearing, in particular one as just described, an inner race and/or an inner race section being inserted into an undeformed outer race in an insertion direction and a flanged shoulder of the outer race then being deformed, so that only by destructive means can the inner race and/or inner race section inserted into the internal space of the outer race be removed from the outer race, particularly in a direction counter to the insertion direction, or in all directions.

The flanged shoulder is preferably deformed, particularly into the centering shoulder, by a radially rotating roller.

It should be noted that the invention also encompasses embodiments with centering shoulders produced on both sides by this method and/or with deformed rim sections arranged on both front faces of the radial roller bearing.

BRIEF DESCRIPTION OF THE DRAWINGS

Further advantages, features and effects of the invention are set forth in the following description of a preferred exemplary embodiment and in the drawings attached, in which.

DETAILED DESCRIPTION OF THE INVENTION

Figure 1:
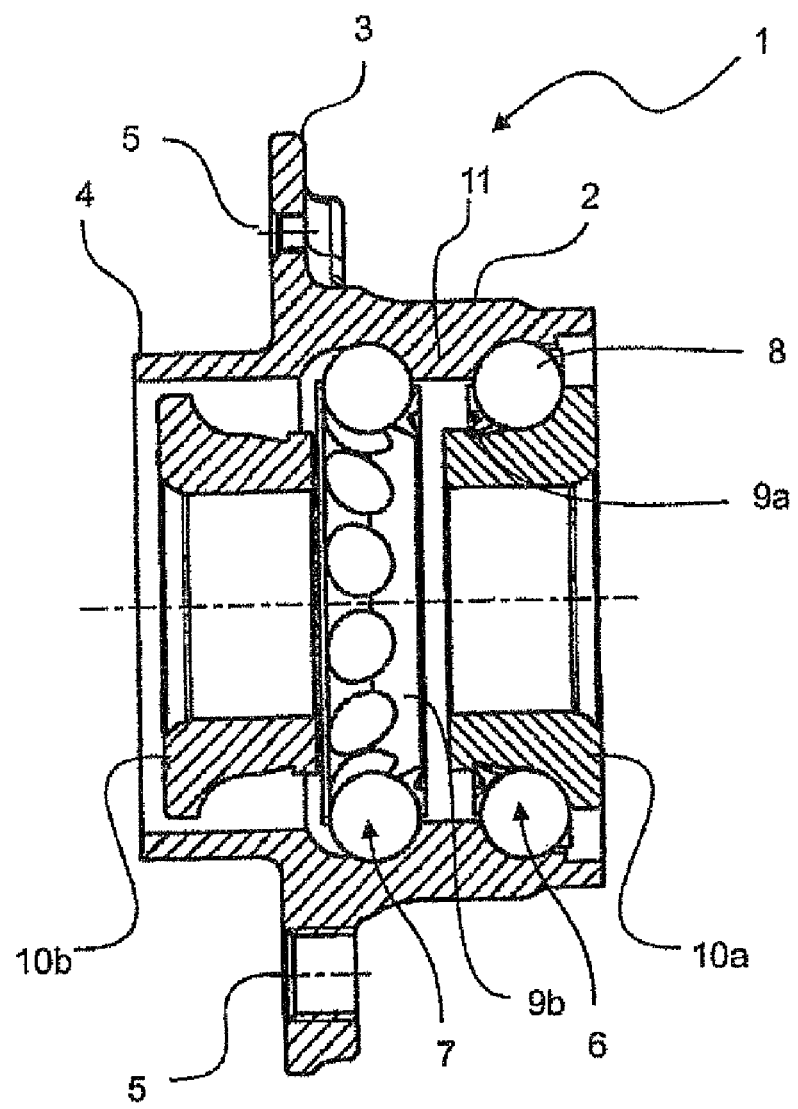
FIG. 1 shows a schematic sectional representation of an exemplary embodiment of a radial roller bearing according to the invention at an intermediate stage during assembly.

The same or corresponding parts are provided with the same reference numerals in each of the figures.

FIG. 1 in a schematic representation shows a longitudinal section through a radial roller bearing 1 along the axial extent as one exemplary embodiment of the invention. In FIG. 1 the radial roller bearing 1 is shown at an intermediate stage during assembly.

The radial roller bearing 1 comprises an outer race 2, which is monolithically formed and integrally connected to a disk-shaped flange 3 and a cup-shaped flanged shoulder 4, which are arranged concentrically with an axle or shaft (not shown) to be fitted in an axial alignment. The flange 3 has a plurality of through-openings 5, which are arranged azimuthally spaced at regular intervals. In the areas of the through-openings 5 the flange 3 is locally reinforced. On the side (hereinafter referred to as the wheel side) the flange 3 is of plane design and forms a contact face for a brake disk (see FIG. 4). The flanged shoulder 4 is formed centrally or concentrically onto the flange 3 on the wheel-side and is embodied as a circular ring or tubular projection.

The radial roller bearing 1 is embodied as a double-row angular-contact ball bearing and accordingly comprises a first ring 6 and a second ring 7 of rolling elements in the form of balls 8 (ball rings 6, 7), each ring 6 and 7 being arranged in a rolling element cage 9a and 9b respectively. For radially inner guidance of the balls 8, a divided inner race is provided, which comprises a first axial inner race section 10a for guiding the first ring 6 and a second axial inner race section 10b for guiding the second ring 7.

In FIG. 1 the first axial inner race section 10a is shown in a fitted position, so that this is already rotatably supported in relation to the outer race 2. In FIG. 1 the second axial inner race section 10b is pushed through the flanged shoulder 4 into an internal space of the outer race 2, where it is to be placed on the second ring 7. As can be seen from FIG. 1, the radial roller bearing 1 is embodied as an engaged radial roller bearing 1, a circumferential raceway web 11, on which the balls 8 roll on both sides, protruding radially inwards from the outer race 2 being formed on between the first ring 6 and the second ring 7. Here, the inside diameter or clear diameter of the raceway web 11 is smaller than the outside diameter of the first ring 6 or the second ring 7 of rotating balls 8, so that this forms a limit stop for the second ring 7 and consequently for the second axial inner race section 10b. The internal space of the outer race 2 accommodating the second axial inner race section 10b is terminated by the raceway web 11, so that the second axial inner race section 10b cannot be pushed through the outer race 2 without destroying it. The internal space is also terminated at a front face 17 of a rim section 18 the outer race 2.

Figure 2:
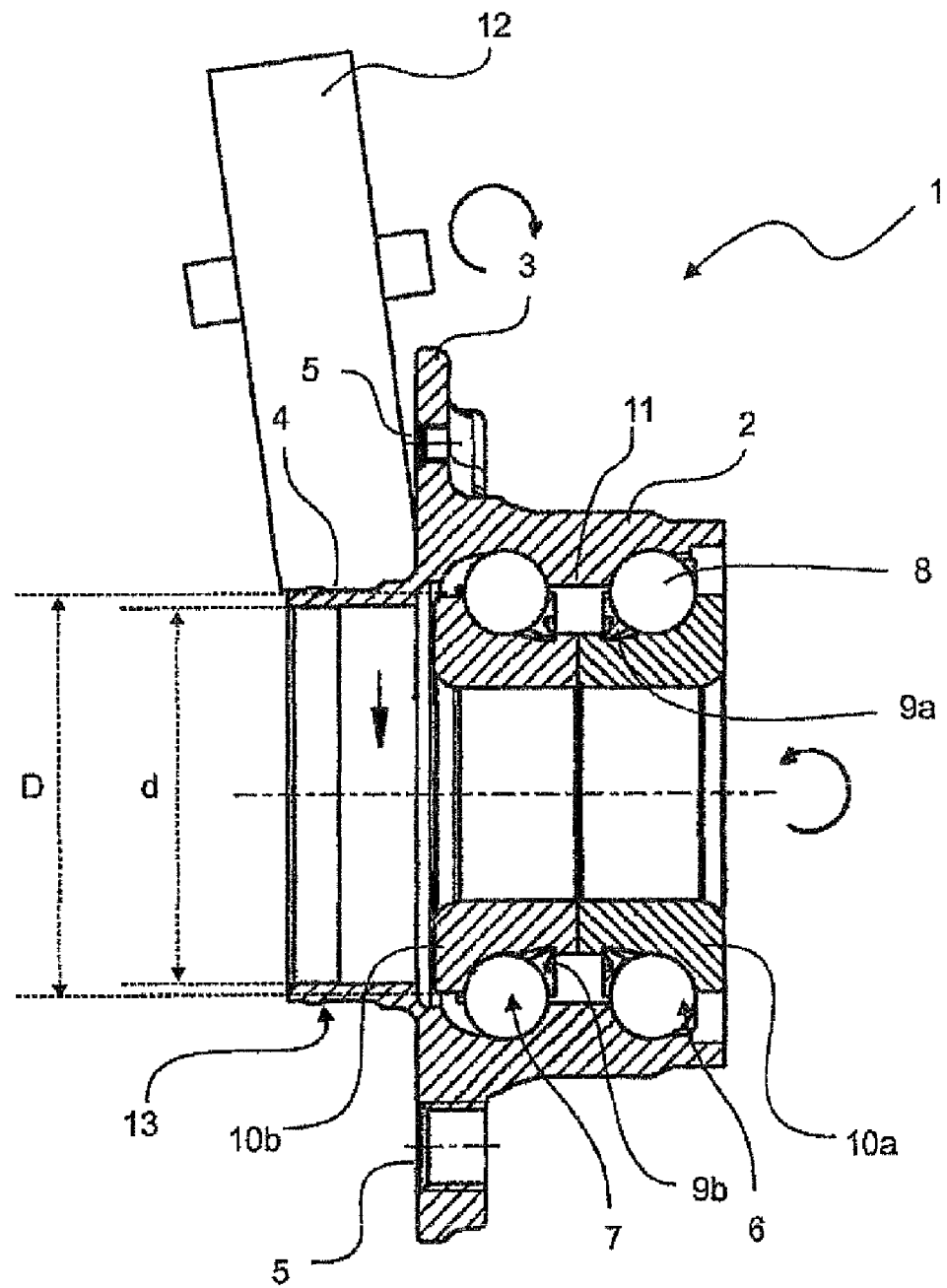
FIG. 2 shows a similar representation of the exemplary embodiment in FIG. 1 during deforming of the flanged shoulder.

FIG. 2 shows the radial roller bearing 1 in FIG. 1 at the next production stage, in which the flanged shoulder 4 is deformed and the inside diameter of the flanged shoulder 4 is reduced.

In the state shown in FIG. 2, the second axial inner race section 10b is brought into the subsequent limit position, so that this too can be rotatably supported in relation to the outer race 2. In this step of the production process the flanged shoulder 4 is deformed into a centering shoulder by a rotating roller or planishing roll 12, in such a way that the inside diameter d of the flanged shoulder 4 is formed smaller than the outside diameter D of the second axial inner race section 10b. The roller 12 optionally has a profile, so that steps 13 are let into the flanged shoulder, which serve for the centering of various components (see FIG. 4).

Figure 3:
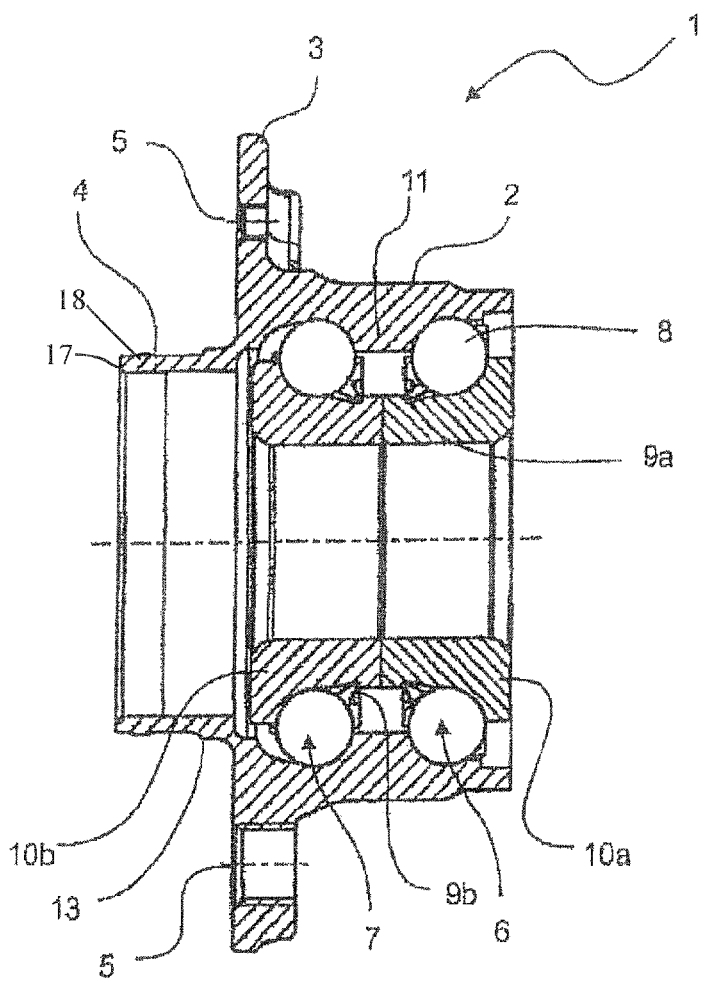
FIG. 3 likewise shows a similar representation of the exemplary embodiment in FIG. 1 as finished product.

FIG. 3 shows the radial roller bearing 1 in the final state, the flanged shoulder 4 now embodied as a centering shoulder being deformed in such a way that a non-destructive removal of the second axial inner race section 10b is impossible: towards the wheel-side removal is prevented by the deformed flanged shoulder 4 and towards the opposite side by the balls 8 of the second ring 7, bearing on the raceway web 11 and acting as a barrier to removal.

At the same time, the flanged shoulder 4 has a centering outside diameter, which is designed to accommodate a wheel rim and/or brake disk and which is significantly reduced compared to known embodiments of radial roller bearings of similar bearing internal construction.

Figure 4:
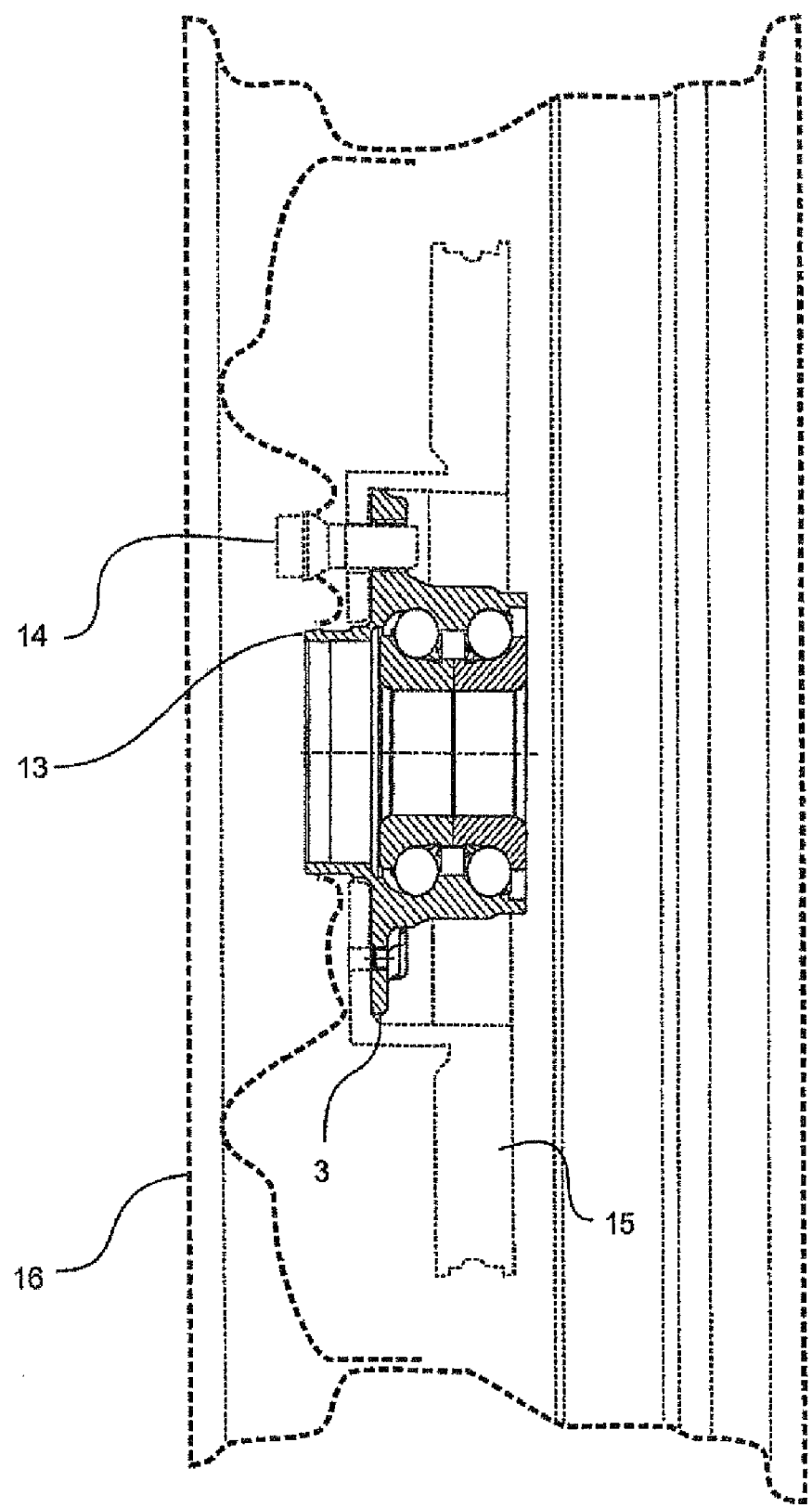
FIG. 4 shows the exemplary embodiment from the preceding figures as finished product in the fitted state.

FIG. 4 finally shows the radial roller bearing 1 in the fitted state, a brake disk 15 and a wheel rim 16 being fitted on the flange 3 by means of fastening bolts 14. As can be seen from the representation in FIG. 4, the various steps 13 are used firstly as centering shoulder for the brake disk 15 and also as centering shoulder for the wheel rim 16.

LIST OF REFERENCE NUMERALS

| | |
|---|---|
| 1 | radial roller bearing |
| 2 | outer race |
| 3 | flange |
| 4 | flanged shoulder |
| 5 | through-openings |
| 6, 7 | ring, ball ring |
| 8 | balls |
| 9a, b | rolling element cage |
| 10a, b | inner race section |
| 11 | raceway web |
| 12 | roller |
| 13 | steps |
| 14 | fastening bolts |
| 15 | brake disk |
| 16 | wheel rim |
| 17 | front face |
| 18 | rim section |

The invention claimed is:

1. A radial roller bearing, comprising:
a monolithically formed outer race having a rim section with a front face and an internal space, the internal space being terminated at the front face of the rim section;
an inner race having at least one inner race section with side faces arranged within the internal space of the outer race; and
a plurality of rolling elements, the rolling elements being arranged between the inner race and the outer race so that the inner race is rotatably supported by the rolling elements in relation to the outer race,
wherein the rim section extends radially inward toward an axis of rotation of the radial roller bearing and only partially beyond one of the side faces of the inner race so as to prevent the inner race from being detached from the outer race, and
wherein the rim section is a flanged shoulder having an outer circumferential surface with a first section, a second section and a third section, the second section being a recess in the outer circumferential surface of the flanged shoulder, axially between the first section and the third section.

2. The radial roller bearing as claimed in claim 1, wherein the rim section is a cup-shaped flanged shoulder.

3. The radial roller bearing as claimed in claim 2, wherein the flanged shoulder is uniformly shaped, extends annularly about the outer race, and is an inlet or an interrupted flanged shoulder.

4. The radial roller bearing as claimed in claim 1, wherein the inner race is divided into two inner race sections.

5. The radial roller bearing as claimed in claim 1, wherein the rolling elements are arranged in at least two or more rows.

6. The radial roller bearing as claimed in claim 1, wherein the rolling elements are angular-contact ball bearings or tapered-roller bearings.

7. The radial roller bearing as claimed in claim 1, wherein the rim section is deformed by a rolling or planishing operation.

8. The radial roller bearing as claimed in claim 1, wherein the radial roller bearing is a wheel bearing.

9. The radial roller bearing as claimed in claim 1, wherein the outer race merges into a seat for a wheel rim and/or a brake disk.

10. The radial roller bearing as claimed in claim 9, wherein the rim section forms a centering shoulder for the wheel rim and/or a brake disk.

* * * * *